(12) United States Patent
Virkar et al.

(10) Patent No.: US 6,368,383 B1
(45) Date of Patent: Apr. 9, 2002

(54) METHOD OF SEPARATING OXYGEN WITH THE USE OF COMPOSITE CERAMIC MEMBRANES

(75) Inventors: Anil V. Virkar, Salt Lake City, UT (US); Christian Friedrich Gottzmann, Clarence, NY (US); Ravi Prasad, East Amherst, NY (US); Bart Antonie Van Hassel, Getzville, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/589,425

(22) Filed: Jun. 7, 2000

Related U.S. Application Data

(60) Provisional application No. 60/138,002, filed on Jun. 8, 1999.

(51) Int. Cl.[7] .............................................. B01D 53/22
(52) U.S. Cl. .............................................. 95/54; 96/11
(58) Field of Search .............................. 95/45, 54; 96/4, 96/7, 10, 11

(56) References Cited

U.S. PATENT DOCUMENTS

| | | | | |
|---|---|---|---|---|
| 1,685,759 A | * | 9/1928 | Walter ........................ 95/54 X |
| 5,240,480 A | | 8/1993 | Thorogood et al. ............... 96/4 |
| 5,534,471 A | * | 7/1996 | Carolan et al. ............. 95/54 X |
| 5,569,633 A | * | 10/1996 | Carolan et al. ............. 95/54 X |
| 5,712,220 A | * | 1/1998 | Carolan et al. ............. 95/54 X |
| 5,817,597 A | * | 10/1998 | Carolan et al. ............... 96/4 X |
| 5,846,641 A | | 12/1998 | Abeles et al. ............ 428/312.8 |
| 5,888,272 A | * | 3/1999 | Prasad et al. ................... 95/54 |
| 5,938,822 A | | 8/1999 | Chen et al. ..................... 96/11 |
| 5,993,619 A | * | 11/1999 | Bloomfield et al. .......... 96/4 X |
| 6,193,784 B1 | * | 2/2001 | Yazawa et al. ................. 95/45 |
| 6,235,187 B1 | * | 5/2001 | Anderson et al. ........... 95/45 X |

FOREIGN PATENT DOCUMENTS

EP 0592809 3/1997

OTHER PUBLICATIONS

Deng et al., "Transport in Solid Oxide Porous Electrodes: Effect of Gas Diffusion", Solid State Ionics 80 (1995) pp 213–222.

* cited by examiner

*Primary Examiner*—Robert H. Spitzer
(74) *Attorney, Agent, or Firm*—David M. Rosenblum

(57) ABSTRACT

A method of separating oxygen from an oxygen containing gas with a composite membrane capable of conducting oxygen ions and electrons. In accordance with the method, the composite membrane is subjected to an operational temperature and the oxygen containing gas at a cathode side thereof. The composite membrane has a dense layer, at least one active porous layer contiguous to the dense layer, and at least one porous support layer. The active porous layer has a thickness and a distribution of pore radii. The distribution of pore radii has a standard deviation from a theoretical radius that would produce a maximum operation flux through the thickness when the thickness is about equal to a product of a constant and the square root of the theoretical radius. The constant is a function of a material used to fabricate the active porous layer, the operational temperature and an oxygen partial pressure within the active porous layer, and a porosity and a tortuosity produced by the pore radii. The standard deviation of the log of the theoretical radius is equal to a product of 1.45 and a shape factor, the shape factor being greater than 0 and no greater than about 0.5.

18 Claims, 6 Drawing Sheets

METHOD OF SEPARATING OXYGEN WITH THE USE OF COMPOSITE CERAMIC MEMBRANES

CROSS-REFERENCE TO RELATED APPLICATIONS

This application claims the benefit of U.S. Provisional Application No. 60/138,002, filed Jun. 8, 1999 which is hereby incorporated by reference as is fully set forth herein.

FIELD OF THE INVENTION

The present invention relates to a method of separating oxygen from an oxygen containing gas with the use of composite ceramic membranes. More particularly, the present invention relates to such a method in which the composite ceramic membrane has multiple layers comprising a dense layer, one or more active porous layers, and one or more porous support layers. Even more particularly, the present invention relates to such a method in which the pore radii, the distribution of pore radii, and thickness of the active porous layer are selected for optimum transport through the membrane.

BACKGROUND OF THE INVENTION

The development of ceramic materials that have high oxygen ion conductivity at elevated temperatures of ranging from between about 600° C., and about 1100° C. has created interest in employing membranes fabricated from these materials in separating oxygen from an oxygen containing gas stream. If the material or membrane also has electronic conductivity, electrons are returned within the membrane and the driving force for ion transfer is provided by a positive ratio of oxygen partial pressures at the feed or cathode side and the permeate or anode side respectively. Dense film membranes require reasonably thick (1 to 2 mm) membranes for structural integrity and, since the oxygen flux is inversely proportional to the membrane thickness, such membranes achieve only moderate oxygen flux levels. Providing a thin active membrane layer supported by a porous matrix, as in a composite membrane, minimizes the resistance of the dense layer. However, other types of resistance such as oxygen surface exchange and chemical potential drop in the support matrix become predominant limitations in such composite ceramic membranes. Composite ceramic membranes, in which one or several porous layers support a thin dense membrane film and in which the limitations mentioned above are addressed, provide significant opportunities for increasing the oxygen flux across the membrane over the levels that are able to be achieved by unsupported dense membranes.

The prior art suggests that there exists a dependency between oxygen flux and the pore size of the pores within the porous layers. For instance, T. Kenjo et al., "LaMnO$_3$ Air Cathodes Containing ZrO$_2$ Electrolyte for High Temperature Oxide Fuel Cells", Solid State Ionics. 57, 1992, pgs. 259–302 discloses that enhancement of oxygen flux across a thin membrane requires an active electron and ion conducting layer adjacent to the dense electrolyte and suggests that flux may be enhanced by decreasing pore diameter. With respect to porous layer thickness it is further shown that there is a limiting thickness beyond which no further enhancement is realized. Similarly, Deng et al., "Transport in solid oxide porous electrodes: Effect of gas diffusion", Solid State Ionics 80, 1995, pgs. 213–222, recognizes an optimum thickness of a porous layer for a maximum level of enhancement of oxygen flux and also, that the location of the optimum varies with the surface area of the pores per unit volume of the layer. U.S. Pat. No. 5,240,480 describes a composite membrane in which a plurality of porous layers support a dense layer. The pore radii of all of the porous layers are less than 10 microns and the pore radii of successive porous layers increase in a direction taken from the dense layer. The porous layer contiguous to the dense layer possesses both ionic and electronic conductivity and the pore radius of the active layer is sufficiently small so as to achieve a significant enhancement of gas phase to electrolyte surface exchange.

None of the prior art discusses the fact that real porous surfaces have not a single pore radius but a distribution of pore radii and that this distribution affects the level (relative to an optimum flux) that can be attained for a given thickness of the porous layer. As will be discussed, the inventors have found that transport through a composite membrane may be optimized beyond that thought possible in the prior art through a relationship of the thickness of the active porous layers to the pore radius and the definition of a permissible range in the standard deviation for the pore radius distribution from the optimum radius.

SUMMARY OF THE INVENTION

The present invention provides a method of separating oxygen from an oxygen containing gas with a composite membrane capable of conducting oxygen ions and electrons. In accordance with the method, the composite membrane is subjected to an operational temperature and the oxygen containing gas with a higher oxygen partial pressure at a cathode side thereof and a lower partial oxygen pressure established at an anode side thereof. It is to be noted that the operational temperature of such a membrane is well known and as indicated above, is typically within a range of between about 600° C. and about 1100° C. Lower and higher operational temperatures have been considered within the prior art. The oxygen containing gas can be air or a gas having oxygen in a bound state, for instance water. Further, the oxygen so separated from the oxygen containing gas can be recovered or further reacted to produce a product at the other side of the membrane, known as the anode side.

The composite membrane has a dense layer, at least one active porous layer contiguous to the dense layer, and at least one porous support layer. The term "active" as used in connection with a porous layer means a layer that is comprised of materials that have both oxygen ion and electron conducting conductivity and include both mixed conducting metallic oxides and multi phase mixtures of oxygen ion conducting metallic oxides and electron conducting oxides and/or electron conducting metals.

The active porous layer has a thickness and a distribution of pore radii. To obtain an oxygen flux at more than 80 percent of the maximum oxygen flux for that layer thickness, the standard deviation of the distribution of the log of the pore radii is equal to a product of 1.45 and a shape factor, the shape factor being greater than 0 and no greater than about 0.5. The thickness is about equal to the product of a constant and the area weighted average of the pore radii. The constant is a function of a material used to fabricate the active porous layer, the operational temperature, an oxygen partial pressure within the active porous layer, and a porosity and a tortuosity produced by the arrangement of pores in the porous layer.

Specifically, the constant for determining the optimum thickness in meters is determined from the relationship:

$$\frac{\sqrt{T}}{94,695}\left(e^{\frac{E_\sigma - E_k}{16.63}\left(\frac{1}{T} - \frac{1}{1273}\right)}\right)\sqrt{\frac{\sigma_{ion}(1-\varepsilon)}{kP_{O_2}^{0.5}\varepsilon\tau}}$$

where:

$\sigma_{ion}$ is an ionic conductivity of the active porous layer [Ohm$^{-1}$/m]

T is the operational temperature [K]

k is a surface exchange factor in the porous layer at 1273 K [mol O$_2$/m$^2$s bar$^n$]

PO$_2$ is an oxygen partial pressure at said active porous layer [bar]

$\varepsilon$ is a porosity of the active porous layer $E_o$ is the activation energy for ion conductivity [J/mol]

$E_k$ is the activation energy for surface exchange [J/mol]

$\tau$ is the tortuosity of the active porous layer.

Where thickness and radius are related by this constant, a maximum oxygen transport or flux can be effected through such a porous layer for a given set of operating conditions. As stated previously, when a porous membrane is fabricated, the pore size varies. The inventors have found, quite unexpectedly, that it is important to construct the membrane with a very specific pore size distribution to obtain an optimum membrane in terms of oxygen transport through the membrane.

The permissible standard deviation of the logarithm to the base 10 of the pore radii that yields more than 80 percent, and preferably more than 90 percent, of the maximum flux is the product of 1.45 times a shape factor that for 80 percent is greater than 0 and no greater than 0.5, and preferably no greater than 0.4 for a flux at 90 percent. Practically, the distribution of pore radii can be determined by optical means, mercury porosimetry, and gas adsorption measurements. The logarithm of each radius in the distribution is then determined from such a result and the standard deviation of the logarithm can be obtained.

As may be appreciated it becomes increasingly more difficult, if not prohibitively expensive, to construct a membrane having pore radii with no deviation. Pore radii that yield a membrane with about an 80 percent flux capability is minimally acceptable. At the other end of the spectrum, 98 percent above is possible if the shape factor is limited to be no greater than about 0.2 and the thickness of the membrane is about equal to a product of the constant and the square root of an area weighted average of the pore radii. An "area weighted average of the pore radii" as used herein and in the claims means a distribution of radii; $r_{avg}$, which is obtained from the distribution of radii by:

$$r_{avg} = \frac{\sum_i r_i A_i / V_i}{\sum_i A_i / V_i}$$

Where:

$r_{avg}$ is the area per unit volume weighted radius $r_i$ is the radius of individual pores and varies from the smallest to the largest radius in the distribution with radii smaller than 0.01 µm not counted for operating temperatures smaller than 850° C. and radii smaller than 0.1 µm not counted for operating temperatures greater than 850° C.

$A_i$ is the sum of the surface areas of all pores of radius $r_i$ $V_i$ is the sum of the volumes of all pores of radius i In the present invention it has been found, unexpectedly, that to obtain optimum performance, the thickness of the active porous layer must decrease in a predetermined relationship with the decrease in radius where the effective pore radii are between 0.01 and 5 microns. Pores with radii smaller than about 0.01 microns will close due to sintering at high temperature operational conditions for the membrane. The value is material and operating temperature dependent. The lower value of 0.01 is applicable at lower membrane operating temperatures of no greater than about 850° C. Pores with radii 0.1 and less will be closed at temperatures of between about 850° C. and about 1100° C. A minimum pore radius of about 0.2 is preferred for operational temperatures at and above about 1000° C. Pore radii larger than about 5 microns provide insufficient surface exchange area.

The relationship for maximum flux can be expressed as a ratio of thickness and the area weighted average of the pore radii set equal to the constant divided by the square root of the area weighted average of the pore radii. The effective interval of the layer thickness over pore radii ratios associated with the above range was found to be between about 3 and 3000 with the lower value associated with the larger radii and the higher value with the smaller radii. Ratios lying in a range of between about 10 and about 2000 are preferred for tortuosities between about 1.2 and about 2.5. For tortuosities of between about 2.3 and 5.0, ratios of between about 6 and about 300 are preferred. For a tortuosity lying between about 5.0 and about 10.0, ratios from between about 4 and about 200 are preferred.

The relationship of thickness to radius is applicable for porous layers on the retentate or cathode side with gas mixtures comprising oxygen and nitrogen and on the anode or permeate side with the use of purge or sweep gases such as steam, carbon dioxide and nitrogen. For an anode side porous layer seeing only oxygen, the optimum thickness to pore radius ratio will be larger. However the optimum will be very flat and diminishing returns reached at a level calculated from the above equation.

The range of effective and practical porosities for membranes with the above parameters is between about 20 and about 60 percent, preferably no less than about 35 percent, and suitable tortuosities are between 1.0 and 5.0. It should be noted that the constant in the pore radius relationship contains (i) the morphological properties of the porous layer, such as porosity and tortuosity, (ii) the physical properties of the layer material, such as ion conductivity and activation energy for ionic conductivity as well as the surface exchange factor and the activation energy for surface exchange, and (iii) temperature and oxygen partial pressure which define the operating environment. Thereby corrections are provided to adjust the optimum ratio of thickness over pore ratio to fit specific selections. The relationship indicates a partial oxygen pressure and operating temperature dependence of the optimum value for t/r. In applications involving the separation of oxygen from air, the pressure dependence has an impact since the partial oxygen pressure can decrease by a factor of more than 4 or more on the cathode as the retentate stream is depleted in oxygen; or on the anode when use of a purge gas leads to a significant variation in oxygen partial pressures on the permeate side or anode. In these cases increasing the thickness of the active porous layers continuously or stepwise, in accord with the equation, as the partial oxygen pressure decreases will lead to higher oxygen fluxes. Similarly, in applications involving reactions of oxygen with a fuel species on the anode, variations in local membrane temperature can be expected. Again the thickness of the active layers adjacent to the dense membrane layer can be adjusted to obtain optimum oxygen flux.

The reason for limiting the thickness of the active layer at smaller pore radii is that at smaller pore radii more chemical potential is consumed per unit thickness to the extent that the flux will actually decrease when the limiting value is exceeded. High tortuosity will increase the drop in chemical potential in the gas phase as well as in the solid phase and therefore reduce the limiting value for the thickness and the ratio of thickness over pore radius. The invention also indicates that it is advantageous to make the pore radii as small as feasible from manufacturing and survivability considerations.

The parameter ranges specified above produce the conditions required to construct active layers that are both efficient and practical. The invention in a further aspect provides guidance for the construction of the inactive support layers, which should consume as little pressure drop as possible. In this regard, the pores of the porous support layers should be larger than those of an adjacent active porous support layer. The at least one porous support layer is commonly contiguous with the at least one active porous layer. It is advantageous to employ multiple support layers with the pore radii increasing away from the active layer. Preferably there are between 1 and 5 of such porous support layers. Pore radii and porosity of each support layer should be as large as possible with the constraint that selected values must still be small enough to support the adjacent layer during manufacturing and operation and maintain mechanical integrity. To meet this requirement, it is desirable to select the pore radius ratio of adjacent layers to be between about 2 and about 15 and preferably between about 5 and about 10 and minimum thickness of these layers at above about 10 times the average pore radius.

The porosity of the porous support layers is preferably greater than about 35 percent. In case multiple layers are used the porous support layers and the active porous layer can be fabricated from materials having different coefficients of thermal expansion with the coefficients of thermal expansion of the porous support layers situated between the outermost of the porous support layers and the dense layers have magnitudes between those of the outermost support layer and the active porous layer. The materials of the porous support layers situated between the outermost of said porous support layers and the dense layer preferably contain a mixture of those materials used in fabricating the active porous layer and the outermost support layer with the content of the active porous layer material decreasing away from that layer.

Two of the at least one active porous layers can be provided to sandwich the dense layer. In this case each of the two layers can be optimized independently. One or more porous support layers can be located on the anode or permeate side of the composite membrane.

It is to be noted that the present invention has applicability that is not limited to the separation and recovery of oxygen. The method of the present invention can be applied to the production of syngas and to such end, a reforming catalyst can be deposited on the surface of the pores of the at least one porous support layer. Alternatively or in addition, a reforming catalyst is located adjacent to or proximate the at least one porous support. The method of the present invention also has applicability to the introduction of a fuel to the anode side of the membrane and reacting the fuel with the permeated oxygen.

BRIEF DESCRIPTION OF THE DRAWINGS

While the present invention concludes with claims distinctly pointing out the subject matter that Applicants regard as their invention, it is believed that the invention will be better understood when taken in connection with the accompanying drawings in which:

DETAILED DESCRIPTION

Figure 1:
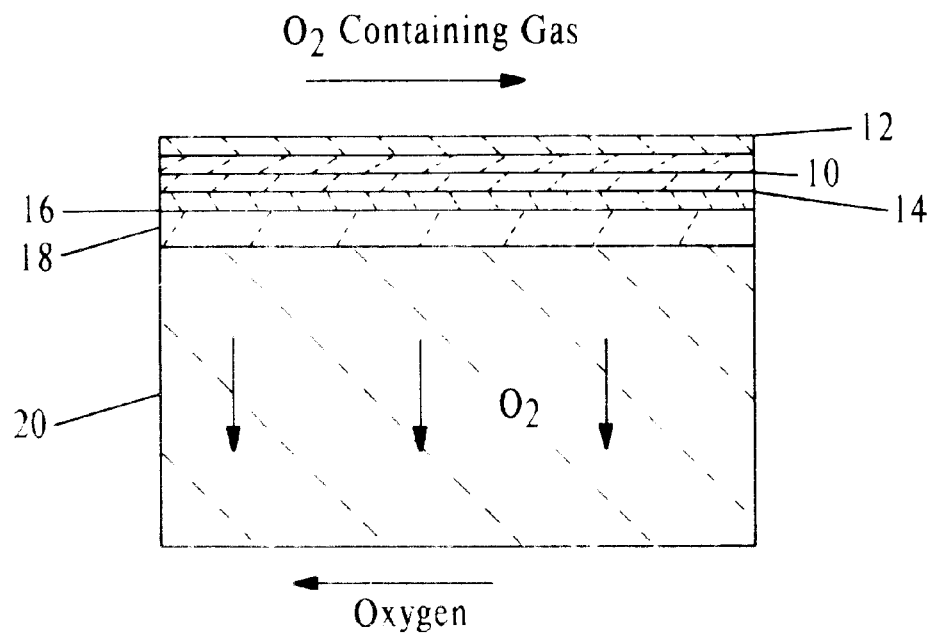
FIG. 1 is a schematic sectional view of a composite membrane used to carry out a method in accordance with the present invention.

FIG. 1 illustrates a composite ion transport membrane for use in a method in accordance with the present invention. The composite ion transport membrane has an active ion and electron conducting porous layer 12 on the cathode or retentate side of the composite membrane, an ion and electron conducting dense layer 10 and an active ion and electron conducting porous layer 14 on the anode or permeate side of the composite membrane. The composite membrane is also provided with porous layers 16, 18 and 20 whose primary function is to provide mechanical support for the thin dense and active porous layers 10, 12, and 14, respectively, and to provide communication channels for gas between the dense and active layers (10, 12, and 14, respectively) and the bulk phase of the oxygen gas on the anode side with minimum drop in oxygen partial pressure consistent with structural requirements.

Dense layer 10 typically has a thickness of between about 5 and about 200 microns, and preferably between about 10 and about 50 microns. The thickness of the active porous layers 12 and 14 is governed by functional considerations discussed hereinafter.

The foregoing composite membrane is specifically designed for recovery of oxygen. In such an application it is advantageous to locate the porous support layers 16, 18, and 20 on the anode since it is only in contact with one gas, oxygen, and therefore, does not suffer additional potential drop due to the resistance from binary gas diffusion. Also with such a configuration, the surface exchange coefficients will be higher both on the cathode and anode surface of the dense layer 10 and on the surfaces of the active porous layers 12 and 14 because the respective oxygen partial pressures will be greater than when the porous support layers are located on the cathode side. The composite membrane as described above can be of tubular or flat configuration. Although not illustrated, for certain applications, porous support layers such as 16, 18, and 20 can also be located at the cathode side.

Figure 2:
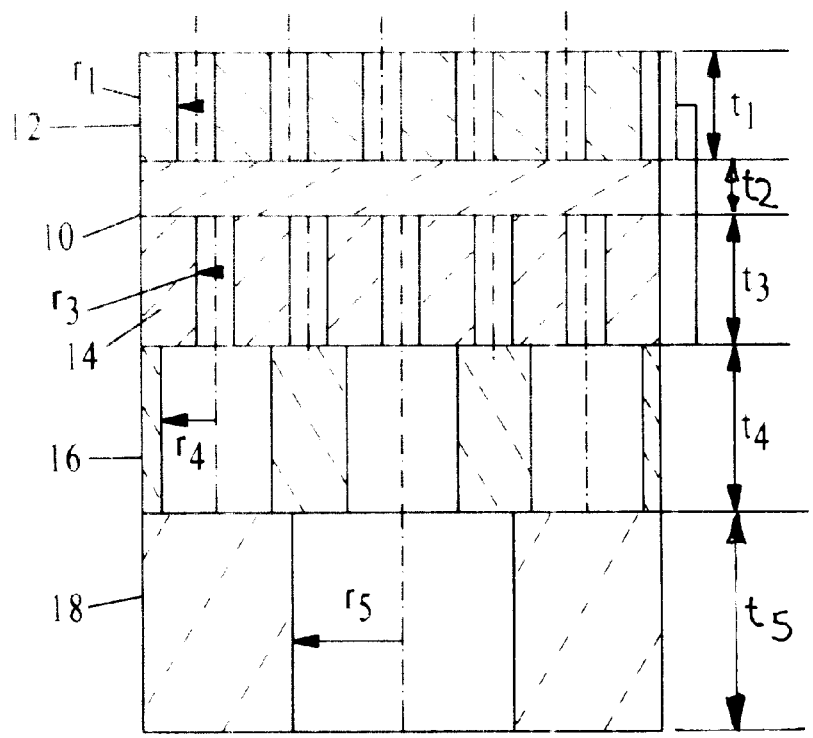
FIG. 2 is an enlarged fragmentary view of FIG. 1.

With additional reference to FIG. 2, pores are represented by cylindrical shapes for simplified analysis. The thicknesses of dense layer 10 active porous layer 12, and porous support layers 16 and 18 are designated by $t_1$, $t_2$, $t_3$, $t_4$, and $t_5$, respectively, and $r_1$, $r_3$, $r_4$, and $r_5$ are the pore radii of their respective layers. Dense layer 10 and active support layers 12 and 14 are formed of ion and electron conducting metallic oxides or a multiphase mixture of ion conducting metallic oxides and electron conducting metals or metal oxides. A detailed listing of suitable materials and some possible methods of manufacture can be found in U.S. Pat. No. 5,938,822 which is hereby incorporated by reference as if fully set forth herein. Since porous support layers 16 and 18 function as mechanical supports only, they need not be capable of conducting ions and electrons but must be mechanically and chemically compatible with adjacent layers. Suitable materials are higher strength oxides such as zirconia, ceria, and alumina, as well as metal alloys such as INCOLOY. The materials selected must have similar thermal coefficients of expansion as adjacent layers.

If there is a difference in thermal expansion coefficients of the active porous layers 12 and 14 and porous support layers 16–20, there is an advantage in selecting materials for the intermediate porous support layers, such as porous support layer 18, with expansion coefficients which gradually change from values near those for the active porous layer 14 to values near those for the outer porous support layer 20. One way of achieving this to prepare the intermediate layers from a mixture of the material used in forming active porous layer 16 and that used in outer porous layer 20 with the percentage of the material used in the active porous layer 14 decreasing in successive porous support layers 16, 18, and 20. For instance, porous support layer 16 could contain 75 percent by weight of the material used in forming the active porous layer 14. Porous support layer 18 could contain 50 percent by weight of such material and porous support layer 20 could contain 25 percent of such material.

The above discussion does not exclude the use of identical materials in active porous layers 12, 14, and porous support layers 16, 18, and 20. Such a material selection will eliminate chemical compatibility and differential thermal expansion problems but typically entails sacrifices in strength and material cost. The number of porous support layers will depend on the pore radius of the adjacent active porous layer. They will vary from a single layer for active porous layer pore radii selected from the upper end of the specified range to as many as four for pore radii selected from the lower end of the specified range.

Figure 3:
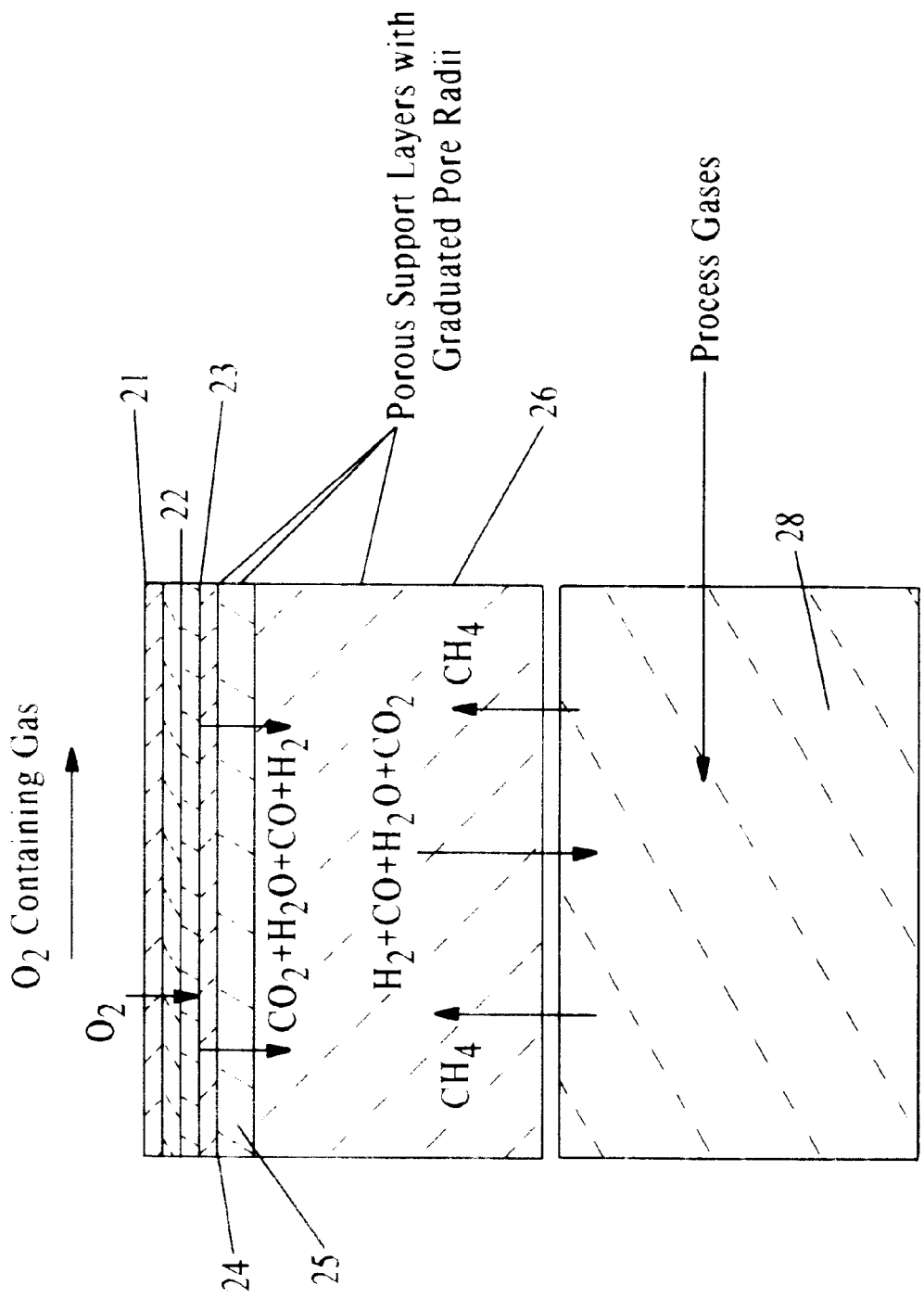
FIG. 3 is a schematic sectional view of a composite membrane used to carry out a method in accordance with the present invention in which syngas is produced.

FIG. 3 illustrates a composite membrane for syngas generation. An active porous layer 21 is located at the cathode side facing the oxygen containing gas, adjacent is the dense layer 22. A second active porous layer 23 is adjacent to the anode side of the dense layer 22 and is supported by layers 24, 25, and 26 with increasing pore radii similar as before. Here active porous layer 23 on the anode side enhances the reaction between permeated oxygen and fuel species. Adjacent to the last porous support layer 26 is a reforming catalyst 28 in the form of beads, or monolithic porous structures. A process gas stream comprising a fuel, such as hydrocarbons and carbon monoxide, steam and recycle gas ($H_2$, CO, and $Co_2$) flows next to or through the catalyst 28. Since in this application fuel species have to diffuse to the anode side of the dense layer 22 and the adjacent porous layer 23, the gaseous environment at and near the anode of the dense layer 22 is less reducing than in the outer porous layers. As a result a complete or partial oxidation reaction will take place here with some reforming occurring as gas moves away from the dense and active layers 23 and 24, respectively. It is advantageous to coat pores of the last porous support layer 26 with a reforming catalyst such as Nickel to induce some endothermic reforming as combustion products flow through the porous support layer 26. This will assist in removing the heat of the exothermic oxidation reaction from the surface of the dense layer 22 and the active porous layer 23. The gradient in oxygen activity in the porous layers will prevent damage to the dense and active layers from exposure to very low oxygen partial pressures, thus permitting a greater degree of freedom in the selection of materials for these layers.

A similar membrane arrangement, but without reforming catalyst, can be employed in applications only requiring oxidation reactions on the anode. In that case the exothermic heat of the oxidation reaction has to be absorbed by the temperature rise of the fluids flowing on the anode and cathode sides.

Figure 4:
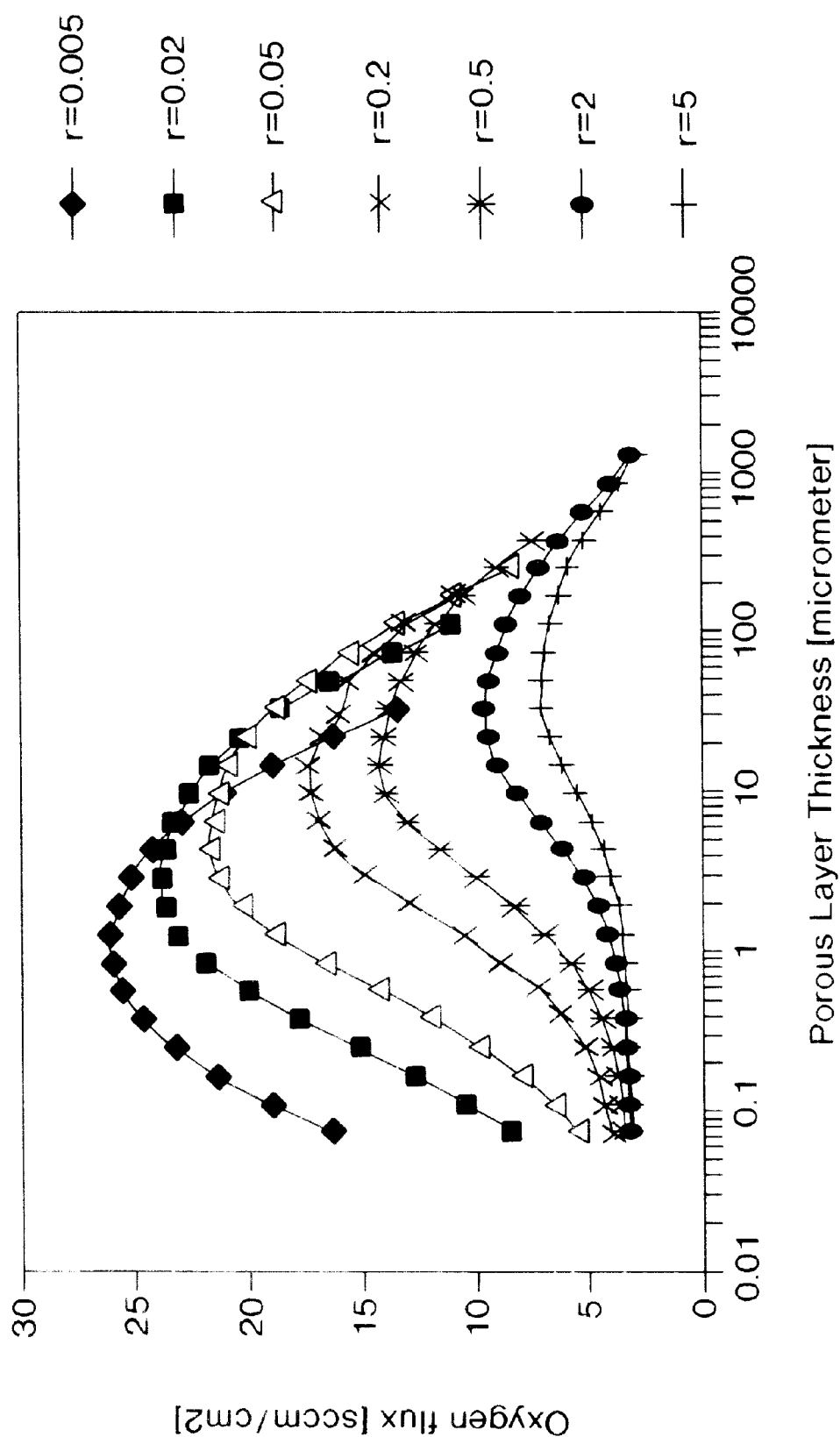
FIG. 4 is a graph of oxygen flux versus porous layer thickness for membranes used in methods in accordance with the present invention.

FIG. 4 illustrates the dependency of oxygen flux versus layer thickness in an active porous layer for a variety of pore radii such as $r_1$. A decrease of the pore radius to a small value produces a large extended area for oxygen surface exchange per unit thickness in the layer but results at the same time in a significant drop in chemical potential per unit thickness with the implication that after a certain thickness threshold has been reached, no further benefits are obtained and actually a penalty is incurred when the thickness is increased further. The penalty is due to the combination of additional potential drop in the gas phase and decreasing effectiveness of the solid phase in conducting oxygen ions.

Figure 5:
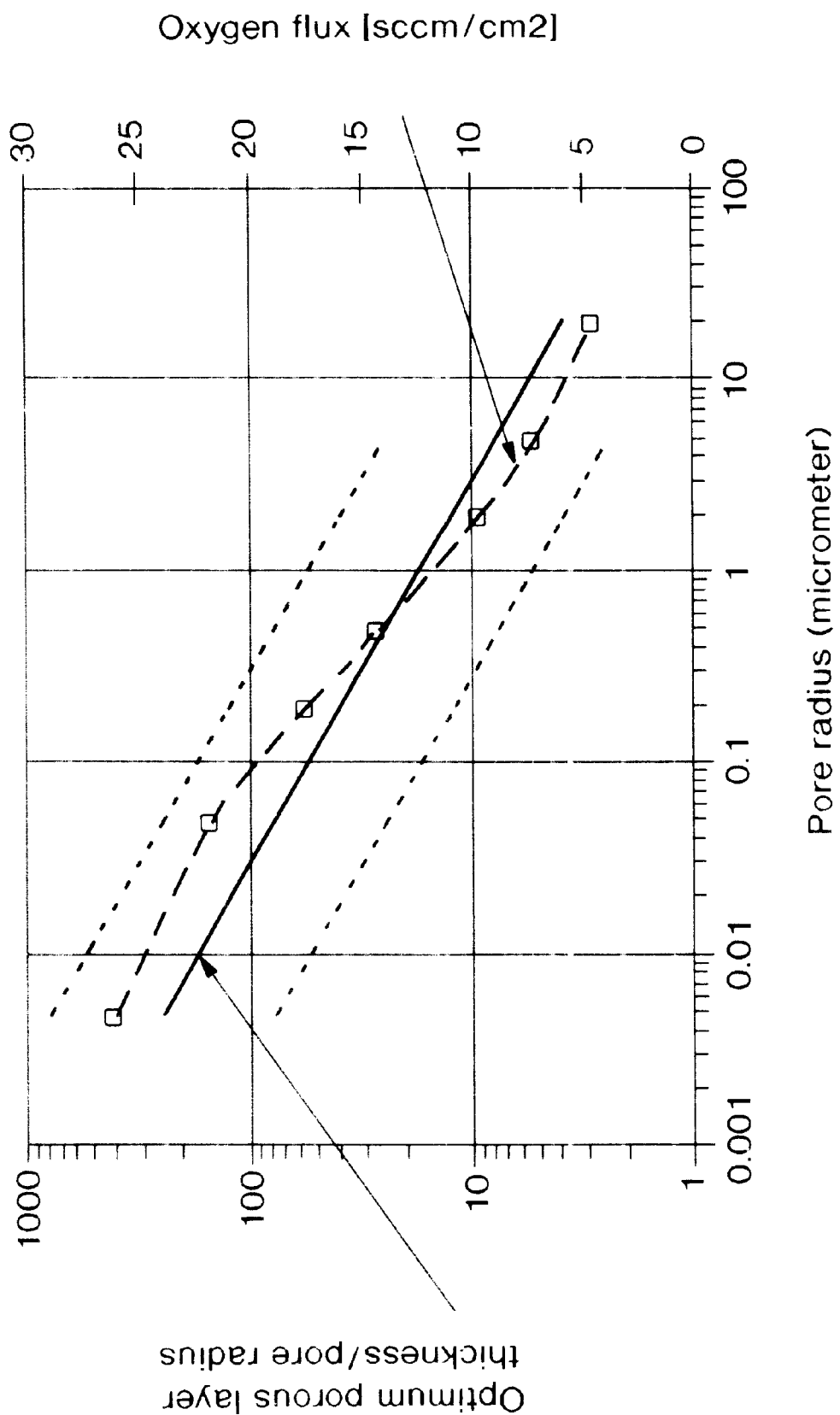
FIG. 5 is a graph of ratio of thickness and pore radius against pore radius for membranes used in methods in accordance with the present invention.

With reference to FIGS. 4 and 5, the diffusion of oxygen gas against stagnant nitrogen in the pores of the porous mixed conducting oxide on the air side of the high performance composite oxygen ion transport membrane was modeled in a computer simulation with the Dusty Gas Model [E. A. Mason and A. P. Malinauskas, Gas Transport in Porous Media: The Dusty-Gas Model, Chemical Engineering Monographs, Vol. 17, Elsevier, Amsterdam, Oxford, N.Y., 1983] which resulted in:

$$J_{O_2} = -\frac{\varepsilon}{\tau} \frac{1}{\frac{1}{D_{Kn,O_2}} + \frac{1-x_{O_2}}{D_{mol,O_2,N2}}} \frac{P}{R_g T}\left(\frac{dx_{O_2}}{dx}\right)$$

where:

$x_{O2}$ = oxygen mole fraction [−]

$D_{molO2,N2}$ = molecular diffusion coefficient of oxygen in an $O_2/N_2$ Mixture [m$^2$/s]

$D_{Kn,O2}$ = Knudsen diffusion coefficient of oxygen [m$^2$/s]

$P$ = total pressure at cathode [bar]

The molecular diffusion coefficient was calculated from the Chapman Enskog Theory [Robert C. Reid, John M. Prausnitz, Bruce E. Poling, The Properties of Gases and Liquids, McGraw-Hill Book Company, New York, Fourth Edition, 1987]:

$$D_{mol,O_2,N_2} = \frac{0.00266 \times 10^{-4} T^{\frac{3}{2}}}{P\left(10^{-3} \frac{M_{O_2} M_{N_2}}{M_{O_2} + M_{N_2}}\right) \sigma_{O_2,N_2}^2 \Omega_D}$$

where:

$M_{N2}$ = molar weight of nitrogen [g/mol]

$\sigma_{O2,N2}$ = characteristic length [Angstrom]

$\Omega_D$ = diffusion collision integral [−]

$M_{O2}$ = Molar Weight of Oxygen (g/mol)

The Knudsen diffusion coefficient is given by:

$$D_{Kn,O_2} = \frac{2}{3}r\sqrt{\frac{8000 R_g T}{\pi M_{O_2}}}$$

where:

$D_{Kn,O2}$ = Knudsen diffusion coefficient of oxygen [m²/s]

$R_g$ = gas constant [J/mol·K]

$T$ = absolute temperature [K]

$P$ = pressure [Pa]

$r$ = pore radius [m]

$M_{O2}$ = molecular weight of oxygen (kg/mol)

The ambipolar diffusion of oxygen ions through the dense mixed conducting oxide film results in the following relation between oxygen flux and driving force:

$$J_{O_2} = -\left(\frac{\langle t_{el} t_{ion} \sigma_{tot}\rangle}{4^2 F^2}\right)\frac{\Delta\mu}{t_g}$$

$t_{el}$ = electronic transport number [−]

$t_{ion}$ = ionic transport number [−]

$\sigma_{tot}$ = total conductivity [Ohm⁻¹m⁻¹]

$F$ = Faraday constant [C./mol]

$\Delta\mu$ = oxygen chemical potential across dense gas separation layer [J/mol]

$t_g$ = thickness of the dense gas separation layer [m]

The viscous flow of oxygen in the pores of the porous mixed conducting oxide on the oxygen product side of the high performance composite oxygen ion transport membrane results in the following relation between the oxygen flux in mols/m² sec and the oxygen pressure gradient:

$$J_{O_2} = -\frac{\varepsilon}{\tau}D_{Kn,O_2}\frac{1}{R_g T}\left(\frac{dP}{dx}\right) - \frac{\varepsilon}{\tau}\frac{r^2}{8R_g T\eta}P\left(\frac{dP}{dx}\right)$$

where:

$P$ = Absolute Pressure (Pa)

$eta$ = gas viscosity [N·s/m²]

The same equation is used to describe the oxygen flow through the inert porous support layers, but with the appropriate thickness, porosity and tortuosity.

The exchange between oxygen in the gas phase and the oxygen ions in the mixed conducting oxide is described by:

$$J_{O_2} = -kP_{O_2}^n\left(\frac{\Delta\mu}{RT}\right)$$

$k$ = rate constant for surface oxygen exchange [molO₂/m²·s·barⁿ]

$PO_2$ = Oxygen partial pressure [bar]

$\Delta\mu$ = oxygen chemical potential drop across interface [J/mol]

$R$ = gas constant [J/mol·K]

$T$ = absolute temperature [K]

$n$ = exponent for oxygen partial pressure [−]

An effective medium approximation is used to describe the simultaneous diffusion of oxygen molecules in the gas phase and oxygen ions in the mixed conducting oxide and the surface exchange in between.

The rate constant for the surface oxygen exchange was determined from experiments with a dense tube. The average oxygen flux through a $Sr_{0.95}Ce_{0.05}CoO_{3-\delta}$ tube was measured between 700–1050° C. The tube had a length of about 6.778 cm, an outer diameter of about 1.13 cm, an inner diameter of about 0.86 cm, and a wall thickness of about 1.3 mm. The outside of the tube was exposed to the oxygen containing feed gas while the inside of the tube was purged with helium. Both the feed and helium purge flow were kept constant at 2 slpm. Three different oxygen mole fraction were used in the feed gas: 0.209, 0.407 and 0.797. The absolute pressure at both sides of the tube was kept at about 1.1 bar. The oxygen flux was computed from the oxygen content in the helium purge stream and its flow rate and scaled on the outside area of the tube. It was corrected for any leak through the seals by using the nitrogen content in the helium purge stream as determined by gas chromatography.

The following expression for the oxygen flux was used to model the oxygen permeation through the dense wall tube:

$$J_{O_2} = -\frac{RT\ln(P_{O_2,low}/P_{O_2,high})}{\left(\left(\frac{1}{\sigma_{ion}e^{-\frac{E_{sigma}}{R}\left(\frac{1}{T}-\frac{1}{1273.15}\right)}}\frac{1}{4^2 F^2}\right)+\left(\frac{1}{\frac{ke^{-\frac{E_k}{R}\left(\frac{1}{T}-\frac{1}{1273.15}\right)}P_{O_2,low}^n}{RT}}\right)+\left(\frac{1}{\frac{ke^{-\frac{E_k}{R}\left(\frac{1}{T}-\frac{1}{1273.15}\right)}P_{O_2,high}^n}{RT}}\right)\right)}$$

The resulting oxygen flux was integrated along the length of the tube in order to obtain the average oxygen flux through the tube under those experimental conditions. Table 1, shows the model parameters that resulted from fitting this expression to the experimental results. The power dependence of the surface exchange coefficient on the oxygen partial pressure was kept constant at n=0.5.

TABLE 1

| | |
|---|---|
| Ionic conductivity at 1273.15 | 214 Ohm$^{-1}$m$^{-1}$ |
| Activation energy for ionic conductivity | 48 kJ/mol |
| Surface exchange coefficient at 1273.15 | 0.26 mol O$_2$/m$^2$.s.bar$^n$ |
| Activation energy for surface exchange coefficient | 134 kJ/mol |

Tables 2–4 provide a list of parameters used in computing the performance of advanced composite membranes.

TABLE 2

Operating conditions

| | |
|---|---|
| Temperature | 1073.15K |
| Air side total pressure | 10 Bar |
| Oxygen mole fraction at air side | 0.209 |
| Oxygen product pressure | 1 Bar |
| Oxygen viscosity at 1073.15K | 56.837 Pa.s |

TABLE 3

Materials parameters

| | |
|---|---|
| Ionic conductivity at 1273.15 | 214 Ohm$^{-1}$m$^{-1}$ |
| Activation energy for ionic conductivity | 48 kJ/mol |
| Surface exchange coefficient at 1273.15 | 0.26 mol O$_2$/m$^2$.s.bar$^n$ |
| Activation energy for surface exchange coefficient | 134 kJ/mol |
| Power dependence of oxygen partial pressure | n = 0.5 |

TABLE 4

High Performance Oxygen Ion Transport Membrane Architecture.

Porous mixed conducting oxide layer on air side:

| | |
|---|---|
| Thickness | 0.075 μm–1.26 mm |
| Porosity | 0.32 |
| Tortuosity gas phase | 2.2 |
| Tortuosity solid phase | 2.2 |
| Pore radius | 0.005–20 μm |

Dense mixed conducting gas separation layer:

| | |
|---|---|
| Thickness | 10 μm |

Porous mixed conducting oxide layer on oxygen product side:

| | |
|---|---|
| Thickness | 8 μm |
| Porosity | 0.32 |
| Tortuosity gas phase | 2.2 |
| Tortuosity solid phase | 2.2 |
| Pore radius | 0.05 μm |

Inert porous support layers

Layer 1

| | |
|---|---|
| Thickness | 6 μm |
| Porosity | 0.32 |

TABLE 4-continued

High Performance Oxygen Ion Transport Membrane Architecture.

| | |
|---|---|
| Tortuosity gas phase | 2.2 |
| Pore radius | 0.3 μm |

Layer 2

| | |
|---|---|
| Thickness | 60 μm |
| Porosity | 0.32 |
| Tortuosity gas phase | 2.2 |
| Pore radius | 3 μm |

Layer 3

| | |
|---|---|
| Thickness | 1 mm |
| Porosity | 0.32 |
| Tortuosity gas phase | 2.2 |
| Pore radius | 15 μm |

With specific reference to FIG. 4, the results of such simulation are shown as a graph of the oxygen flux as a function of layer thickness for different pore radii of the active layer on the cathode side of the membrane. It illustrates that, for a given pore radius, flux decreases after a certain value of the thickness has been reached and that there is an optimum thickness for the active porous layer for each pore radius. Beyond that thickness the oxygen flux declines due to a gas phase diffusion limitation. Furthermore the crossover in flux curves for different pore radii indicates that the advantage in extended area for smaller pore radii is negated if too great a thickness is chosen for the active layer.

With specific reference to FIG. 5, the maxima of the results of FIG. 4 were plotted as a function of the ratio of thickness and pore radius versus pore radius. The plot demonstrates that there is an approximately one over square root dependence on the pore size. A sensitivity analysis shows that the expression holds for the optimum thickness/pore size ratio for given values of the pore size, porosity, tortuosity, materials parameters (ion conductivity and surface exchange rate) and operating conditions (temperature and oxygen partial pressure). A semi-empirical simplified expression was derived for the relationship between pore radius r and the thickness over pore radius ratio $t/r$, at optimum flux enhancement.

$$(t/r)_{optimum} = \frac{1}{F}\frac{\sqrt{R}}{2\sqrt{2}}\left(\sqrt{T}\,e^{-\frac{(E_{sigma}-E_k)}{R}(\frac{1}{T}-\frac{1}{1273.15})}\right)\sqrt{\frac{\sigma}{kP_{O_2}^n}\frac{1-\varepsilon}{\varepsilon}\frac{1}{\tau}\frac{1}{r}}$$

Using the numerical values for F and R and assuming n=0.5, which is representative for typical oxygen partial pressures the equation can be simplified to:

$$t/r = \frac{\sqrt{T}}{94,695}\left(e^{\frac{E_\sigma - E_k}{16.63}(\frac{1}{T}-\frac{1}{1273})}\right)\sqrt{\frac{\sigma_{ion}(1-\varepsilon)}{kP_O^{0.5}\varepsilon\tau}}\sqrt{\frac{1}{r_{avg}}}$$

The porous materials used for this invention do not have a single value for their pore radius but do have a distinct pore size distribution. The pore size distribution is the consequence of the distribution of the particle sizes from which the porous layer is formed and or the distribution of pore former sizes used as an aid in establishing higher porosities or larger pore diameters. Pore formers are materials used in the formation of the green precursor of the layer which are later removed by oxidation or pyrolysis and can be graphite or organic materials. A normal distribution is one of the possible pore size distributions but others can be considered as well. The small pores in the distribution provide a much larger contribution to the surface area per unit of volume than the larger pores as the area per unit of volume is proportional to 1/r. This is accounted for by calculating the surface area per volume average of the pore size distribution, which can be calculated from:

$$r_{avg} = \frac{\sum_i r_i A_i / V_i}{\sum_i A_i / V_i}$$

where:

$r_{avg}$ is the area per unit volume weighted radius $r_i$ is the radius of individual pores and varies from the smallest to the largest radius in the distribution with radii smaller than 0.01 μm not counted $A_i$ is the sum of the surface areas of all pores of radius $r_i$ $V_i$ is the sum of the volumes of all pores of radius i.

When the activation energy for the ionic conductivity is lower than the activation energy for the surface exchange, then the optimum thickness/pore size ratio will decrease with an increase in temperature. The optimum thickness/pore size ratio will increase with a decrease in oxygen partial pressure (assuming n>0), which may occur when a significant fraction of the oxygen in the oxygen containing gas is recovered from the air stream. A material with a smaller ion conductivity/surface exchange rate ratio will need a smaller thickness/pore size ratio in order to achieve its optimum flux. The extended area ratio is the surface total area in the porous layer over the area of the dense layer. In the extreme of an infinite surface exchange rate no porous mixed conducting oxide layers would be required.

The expression for the optimum ratio of thickness to area weighted average pore radius includes the porosity ε and tortuosity τ. While it is desirable to construct porous surfaces with as low a tortuosity as possible it can vary significantly in practice with a noticeable impact on chemical potential drop in the gas and solid phases at high tortuosities. The porosity also has an impact since it affects the area available for oxygen ion transport in the solid phase and the flow area for gas transport in the gas phase of the porous matrix.

As discussed earlier the minimum radius that will not survive will depend on the operating temperature and on the material selected. Practical experience indicates that minimum value of about 0.2 microns is applicable for almost all candidate membrane materials up to an operating temperature of about 1000° C. A limiting value of 0.01 microns becomes operative at temperatures below about 850° C. It should be noted that at larger pore radii, oxygen flux enhancement is limited by the extended area available for oxygen surface exchange. For instance the extended area ratio available at 30 percent porosity for a pore radius of 10 microns is only about 6 even with a fairly large porous layer thickness of 100 microns.

On the basis of computations, moderated by practical considerations, preferred ranges have been selected for the geometric parameters that define the active porous layers. They are an area weighted average pore radius of between about 0.01 to about 5 microns, a ratio of thickness and pore radius of between about 3 to about 3,000, a porosity of between about 20 percent and about 60 percent and a tortuosity of between about 1.0 and about 10.0. More specifically, for tortuosities from about 1.2 to 2.5, the ratio of thickness and pore radius should be between about 10 and about 2000. For tortuosities between about 2.3 and about 5.0, the ratio should be between about 6 and about 500 and for tortuosities from between about 5 and about 10 the ratio should be between about 4 and about 200.

It was discovered that the oxygen flux depended on the pore radius in the air side porous mixed conducting layer to a good approximation according to the following expression:

$$J_{O_2}(r) = Ae^{-\frac{1}{2}\left(\frac{\log r - \log r_{opt}}{w}\right)^2} \quad (1)$$

where:

$A$ = flux at $r_{opt}$ [sccm/cm$^2$]

Figure 6:
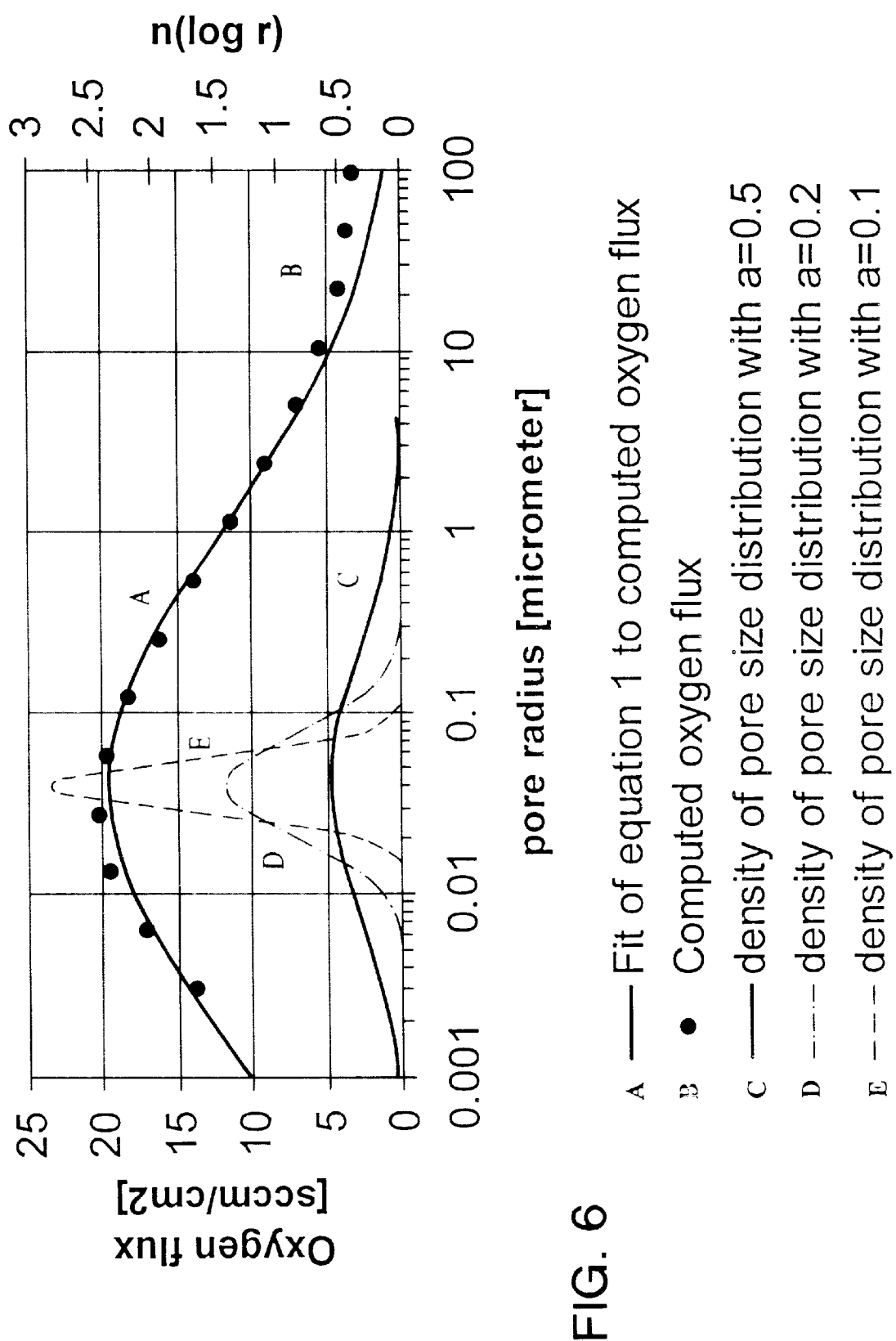
FIG. 6 is a graph of the dependence of the computed oxygen flux on the pore radius for a 24 micrometer thick porous mixed conducting oxide layer on the air side of a composite oxygen transport membrane.

$r_{opt}$ = pore radius for that layer thickness which yields maximum flux $r$ = pore radius $w$ = width of the oxygen flux dependence on pore radius $w_j$ was found to be 1.45±0.07. This is shown in FIG. 6 for a porous mixed conducting oxide layer thickness of 24 micrometer. This led to the discovery that an oxygen flux through a composite OTM could be obtained at a value of 80% or higher of the maximum oxygen flux if for example the density of the pore size distribution, n(logr), is given by:

$$n(\log r) = \frac{1}{aw\sqrt{2\pi}} e^{-\frac{1}{2}\left(\frac{\log r - \log r_{max}}{aw}\right)^2} \quad (2)$$

where:

$n(\log r)$ = density of the distribution at log $r$ $\log r_{max}$ = logarithm of the pore radius with highest probability density $aw = \sigma_r$ standard deviation of the distribution of $\log_{10}$ of the pore radius $a$ = shape factor and the pore size distribution in that porous layer is controlled within about the following range:

$$\log r_{maxi} - 2aw < \log r < \log r_{max} + 2aw \quad (3)$$

with 0<a≦0.5 for an oxygen flux 80 percent of maximum, 0<a<0.4 for an oxygen flux 90 percent of maximum and 0<a<0.3 for an oxygen flux 95 percent of maximum. The probability density function in equation 2 has the following properties:

$$\int_{-\infty}^{+\infty} n(\log r) d\log r = 1 \quad (4)$$

and the probability that the logarithm of the pore radius is between a and b is given by:

$$P(a < \log r < b) = \int_a^b n(\log r) d\log r \quad (5)$$

The resulting area per volume weighted average oxygen flux through a porous mixed conducting oxide layer with such a pore size distribution is given by:

$$\langle J_{O_2} \rangle = \frac{\int_{\log(r_{max})-2aw}^{\log(r_{max})+2aw} J_{O_2}(r) n(\log r) \frac{1}{r} d\log(r)}{\int_{\log(r_{max})-2aw}^{\log(r_{max})+2aw} n(\log r) \frac{1}{r} d\log(r)} \quad (6)$$

and for a=0.5 yields a value of more than 80 percent of the maximum oxygen flux (A) if $r_{opt}=r_{max}$. The maximum of the pore size distribution ($r_{max}$) does not need to coincide with the optimum in the oxygen flux versus pore size plot ($r_{opt}$) for reaching more than 80 percent of the optimum oxygen flux. For certain pore size distributions, in which the area per volume averaged pore radius is much smaller than the pore size at the maximum probability density, it is even advantageous when the pore size at the maximum probability density is larger than the pore size at the optimum in the oxygen flux versus pore size plot.

It should be understood that the invention covers also an alternative linear distribution characterized by the expression:

$$n(r_1) = \frac{1}{\sigma_{rl} \sqrt{2\pi}} e^{-\frac{1}{2}\left(\frac{rl-r_{max}}{\sigma_{rl}}\right)^2} \quad (7)$$

as long as this distribution falls in the range described by equation (2)
where:
  rl is the pore radius in the linear distribution of pore radii
  $\sigma_{rl}$ the standard deviation of the pore radii in the linear distribution.

More complicated pore size distributions, including bimodal and trimodal pore size distributions and pore size distributions with a significant tail on either side of the mean pore radius, can be considered as well and would fall within the scope of this invention.

FIG. 6 shows the oxygen flux as a function of the logarithm of the pore radius for a porous mixed conducting oxide thickness of 24 micrometer. From this graph the following parameters were obtained: an optimum pore radius ($r_{opt}$) of 0.04 micrometer, a width of 1.41 and a pre-exponential factor A=19.57 sccm/cm². Substituting these parameters in equation 6 with a=0.5 and $r_{opt}=r_{max}$ yields an area per volume averaged oxygen flux of 16.3 sccm/cm² which is 83.2 percent of the optimum oxygen flux. A higher average oxygen flux is obtained when a narrower pore size distribution is used around the optimum value of the pore radius for that porous layer thickness. For instance, an area per volume averaged oxygen flux of 19.5 sccm/cm² (99.6 percent of the optimum oxygen flux) is obtained when a=0.1 and $r_{opt}=r_{max}$. The figure also shows the distribution of the density as a log of the pore radii at values for "a" (scale factor)=0.5, n=0.2, and n=0.1.

The porous support layers can be made from any material that is chemically compatible with adjacent layers and has similar thermal expansion coefficients near the manufacturing and operating temperatures of ion transport membranes in the prevailing gaseous environment. The pressure drop through the support layers should be as small as possible consistent with structural and manufacturing requirements. Therefore the porosity of these layers should be as high as possible within the constraint of structural requirements, preferably between 20 and 60 percent and more preferably above 35 percent. As contemplated herein it is desired to select the ratio of the radii of adjacent layers, for example $r_4/r_3$, and $r_5/r_4$ in FIG. 2, between 2 and 15 and preferably between 5 and 10 and the thickness to radius ratio of each layer greater than 10. This enables supporting the adjacent layer adequately during manufacture and operation. The requirement for very small pore radii in the active layer combined with minimum pressure drop in the support layers leads typically to multiple layer structures. The foregoing radii and ratios within the porous support layers are based upon a simple average of radii as, for instance, determined by mercury porosimetry.

Figure 7:
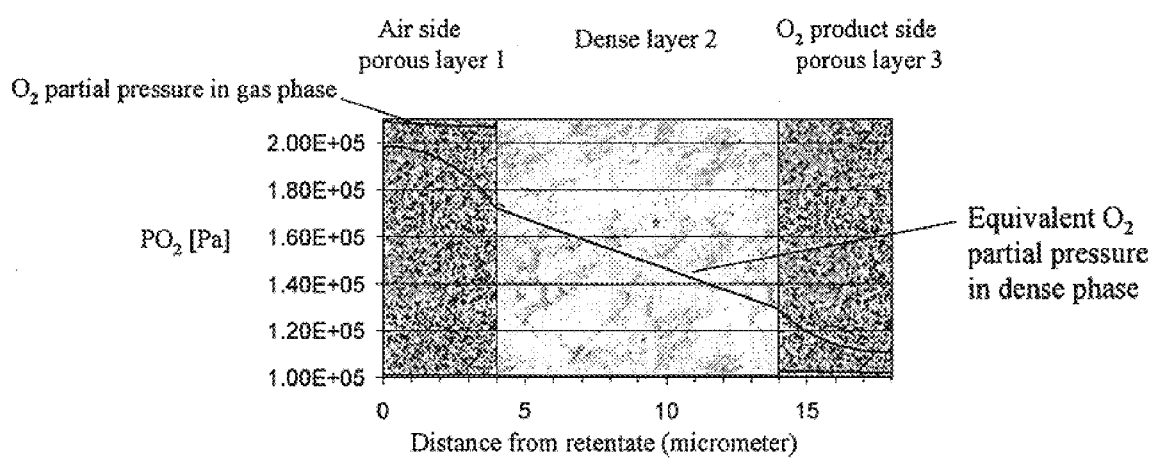
FIG. 7 is a diagram of oxygen partial pressure in the gas phase and an equivalent oxygen partial pressure in the solid phase of a membrane used in accordance with a method of the present invention at about 800° C.

An example of a suitable morphology for a composite membrane structure representative of the invention and following FIG. 7 is given in Table 5 below. This morphology, as well as other parameters set forth in Table 5 were used in obtaining oxygen chemical potential profiles through such a structure and are graphically set forth in FIG. 7.

TABLE 5

Parameters used for obtaining oxygen partial pressure curves in cross section of a composite ceramic membrane

| | |
|---|---|
| Temperature | 1073.15 K |
| Air side total pressure | 10 Bar |
| Oxygen mole fraction at air side | 0.209 |
| Oxygen product pressure | 1 Bar |
| *Porous mixed conducting oxide layer on air side:* | |
| Thickness | 4 μm |
| Porosity | 0.35 |
| Tortuosity gas phase | 2.2 |
| Tortuosity solid phase | 2.2 |
| Pore radius | 0.05 μm |
| Ionic conductivity at 1273.15 | 214 Ohm$^{-1}$m$^{-1}$ |
| Activation energy for ionic conductivity | 48 kJ/mol |
| Surface exchange coefficient at 1273.15K | 0.26 mol O$_2$/m$^2$.s.bar$^n$ |
| Activation energy for surface exchange coefficient | 134 kJ/mol |
| Power dependence on oxygen partial pressure | n = 0.5 |
| *Dense Layer* | |
| Dense layer thickness: | 10 μm |
| Ionic conductivity at 1273.15K | 214 Ohm$^{-1}$m$^{-1}$ |
| Activation energy for ionic conductivity | 48 kJ/mol |
| Surface exchange coefficient at 1273.15K | 0.26 mol O$_2$/m$^2$.s.bar$^n$ |
| Activation energy for surface exchange coefficient | 134 kJ/mol |
| Power dependence on oxygen partial pressure | n = 0.5 |
| *Porous mixed conducting oxide layer on oxygen product side:* | |
| Thickness | 4 μm |
| Porosity | 0.35 |
| Tortuosity gas phase | 2.2 |
| Tortuosity solid phase | 2.2 |
| Pore radius | 0.05 μm |
| Ionic conductivity at 1273.15K | 214 Ohm$^{-1}$m$^{-1}$ |
| Activation energy for ionic conductivity | 48 kJ/mol |
| Surface exchange coefficient at 1273.15K | 0.26 mol O$_2$/m$^2$.s.bar$^n$ |
| Activation energy for surface exchange coefficient | 134 kJ/mol |
| Power dependence on oxygen partial pressure | n = 0.5 |
| Oxygen viscosity at 1073.15K | 56.837 Pa.s |
| *Inert porous support layers* | |
| Layer 1 | |
| Thickness | 6 μm |
| Porosity | 0.35 |

TABLE 5-continued

Parameters used for obtaining oxygen partial pressure
curves in cross section of a composite ceramic membrane

| | |
|---|---|
| Tortuosity gas phase | 2.2 |
| Pore radius | 0.3 $\mu$m |
| Layer 2 | |
| Thickness | 60 $\mu$m |
| Porosity | 0.35 |
| Tortuosity gas phase | 2.2 |
| Pore radius | 3 $\mu$m |
| Layer 3 | |
| Thickness | 1 mm |
| Porosity | 0.35 |
| Tortuosity gas phase | 2.2 |
| Pore radius | 15 $\mu$m |

FIG. 7 illustrates clearly the importance of resistances such as surface exchange, indicated by the difference between the gas phase potential and the solid phase potential, and gas diffusion, indicated by the gradient of the gas phase potential line. The decreasing slope of the solid potential gradient in the porous layers 1 and 3 indicates the diminishing contribution of the outer portion of the active layers. It should also be noted that a remarkable high oxygen flux value of 22 sccm/cm$^2$ was calculated for the example in spite of the relatively low operating temperature of 800° C.

While the present invention has been described with reference to a preferred embodiment, as will occur to those skilled in the art, numerous additions and changes can be made without departing from the sprit and scope of the present invention.

What is claimed is:

1. A method of separating oxygen from an oxygen containing gas with a composite membrane capable of conducting oxygen ions and electrons, said method comprising:

subjecting said composite membrane to an operational temperature and said oxygen containing gas with a higher oxygen partial pressure at a cathode side thereof and establishing a lower oxygen partial pressure at an anode side thereof;

said composite membrane having a dense layer, at least one active porous layer contiguous to said dense layer, and at least one porous support layer;

the active porous layer having a thickness and a distribution of pore radii, the distribution of pore radii having a standard deviation in the distribution of the log of pore radii, the standard deviation being equal to a product of 1.45 and a shape factor, the shape factor being greater than 0.0 and no greater than about 0.5, said thickness being equal to about the product of a constant and the square root of the area weighted average pore radius, and the constant being a function of the material used to fabricate said active porous layer, said operational temperature, an oxygen partial pressure within said active porous layer, and a porosity and a tortuosity produced by an arrangement of the pores.

2. The method of claim 1, wherein said shape factor is no greater than about 0.4.

3. The method of claim 1, wherein said shape factor is no greater than about 0.2.

4. The method of claim 1, wherein the porosity of said at least one active porous layer is between about 20 percent and about 60 percent, the area weighted average pore radii are between about 0.01 and about 5 microns and a ratio of said thickness and said area weighted average of said pore radii is between about 3 and about 3000.

5. The method of claim 4, wherein the porosity of said at least one active porous layer is no less than about 35 percent.

6. The method of claim 4, wherein said tortuosity is between about 1.2 and about 2.5 and said ratio of said thickness and said area weighted average of said pore radii is between about 10 and about 2000.

7. The method of claim 4, wherein said tortuosity is between about 2.3 and about 5.0 and said ratio of said thickness and said area weighted average of said pore radii is between about 6 and about 500.

8. The method of claim 4, wherein said tortuosity is between about 5.0 and about 10.0 and said ratio of said thickness and said area weighted average of said pore radii is between about 4 and about 300.

9. The method of claim 1 wherein said at least one porous support layer is contiguous with said at least one active porous layer.

10. The method of claim 9 wherein said at least one porous support layer comprises a plurality of said porous support layers having an average pore radii increasing in a direction taken from said dense layer.

11. The method of claim 10 wherein there are no more than five of said porous support layers.

12. The method of claim 9 wherein said at least one porous support layer comprises a plurality of said porous support layers and a pore ratio of average pore radii of pores located within adjacent porous support layers is between about 2 and about 15.

13. The method of claim 9, wherein:

said at least one porous support layer comprises a plurality of said porous support layers;

a ratio of average pore radii of pores located within adjacent porous support layers is between about 5 and about 10; and the thickness of each of the porous support layers is above about 10 times the average pore radius.

14. The method of claim 9 wherein said at least one porous support layer comprises a plurality of said porous support layers and the porosity of said porous support layers is greater than about 35 percent.

15. The method of claim 9 wherein:

said at least one porous support layer comprises a plurality of said porous support layers;

the porous support layers and the at least one active porous layer are fabricated from materials having different coefficients of thermal expansion; and the coefficients of thermal expansion of said porous support layers situated between an outermost of said porous support layers and said dense layer have magnitudes between those of the outermost support layer and the active porous layer.

16. The method of claim 15, wherein the materials of the porous support layers situated between the outermost of said porous support layers and said active porous layer contain a mixture of those used in fabricating said active porous layer and said outermost of the outermost support layer and where the percentage of the active porous layer material in the respective porous support layers gradually decreases away from said active porous layer.

17. The method of claim 1, wherein said at least one porous support is located on the anode or permeate side of said membrane.

18. The method of claim 1, wherein two of said active porous layers sandwich said dense layer.

* * * * *